June 15, 1943.  M. WELLS  2,322,077

ELECTRODE HOLDER

Filed June 13, 1942

MARTIN WELLS,
INVENTOR.

BY *Jesse P. Whann*

ATTORNEY.

Patented June 15, 1943

2,322,077

UNITED STATES PATENT OFFICE 2,322,077

ELECTRODE HOLDER

Martin Wells, Los Angeles, Calif.

Application June 13, 1942, Serial No. 446,884

13 Claims. (Cl. 219—8)

My invention relates to holders for use in electric arc welding. Holders of this character ordinarily comprise a handle with a jaw mechanism at the forward end thereof which grips a rod or welding electrode of the material which is to be applied to other metallic objects or bodies so as to form a weld thereon or to join metal parts by means of a weld.

It is an object of the invention to provide an electrode holder of this class wherein its metal parts are protected by insulation so as to prevent contact of the same with other metal objects, thereby avoiding the difficulties arising from the contact of the metal parts of the electrode holder with electrically grounded metal objects or structure. It is a practice to build up a metal structure, for example, the hull of a ship, by progressively welding to the structure metal parts such as beams, plates, etc. The metal structure is grounded with one pole of the welding generator, and the other pole of the generator is connected by means of a cable with the electrode holder. If a metal part of the holder is allowed to contact the grounded structure, the welding circuit will be closed and an electric spark will be produced, or the metal of the holder may become stuck to the structure. Welding operations are often performed in small spaces in a structure, wherein it is difficult to avoid contact of the holder with the grounded structure. Electrode holders of the type commonly used have metal jaws or operating levers exposed so that if the holder is laid down upon the electrically grounded metal structure, contact of one or more of these metal parts of the holder with the grounded structure will be made, and if the cable leading from the generator to the holder is electrified, an arc will be formed, and often the holder will be stuck to the structure as previously described. Even if the electrode is not welded to the grounded structure, there will be at least some injury to the electrode holder. So that he may have both hands free for arranging or placing a part which is to be welded, the welder often finds it necessary to go back or send a helper back to the welder to disconnect the cable or turn off the generator so that the electrode holder may be laid down upon the adjacent structure.

It is an object of my invention to provide an electrode holder which may be laid down at any time without the necessity of disconnecting the cable from the generator or shutting down the generator.

A further object of the invention is to provide an electrode holder wherein all of its metal parts are concealed or covered in such a manner that not only may the electrode holder be laid down as desired, but also is of particular utility in welding operations carried on in relatively inaccessible places, for example, down in a corner or recess, or in a small space between metal members placed relatively close together. The entire electrode holder being protected by durable insulating means, its metal parts cannot be inadvertently brought into contact with electrically grounded metal parts.

A further object of the invention is to provide an insulated electrode holder so formed that it may be laid down in, and will remain in, a position wherein an electrode held by its jaws will be supported out of contact with the wall or floor on which the holder is rested.

It is an object of the invention to provide simple and durable insulator members replaceably held on an electrode holder providing the protection and advantages set forth in the foregoing.

It is a further object of the invention to provide an electrode holder having metal and insulation members in cooperative relation so as to permit ready attachment of the insulating members to the metal parts of the holder which are to be protected.

A further object of the invention is to provide simple jaw protecting members which may be applied and secured in place without need for use of screw fastening members or rivets, and which in fact require no tools for the application thereof to the supporting parts of the electrode holder.

Further objects and advantages of my invention will appear in the following part of the specification.

Referring to the drawing which is for illustrative purposes only,

Figure 1:
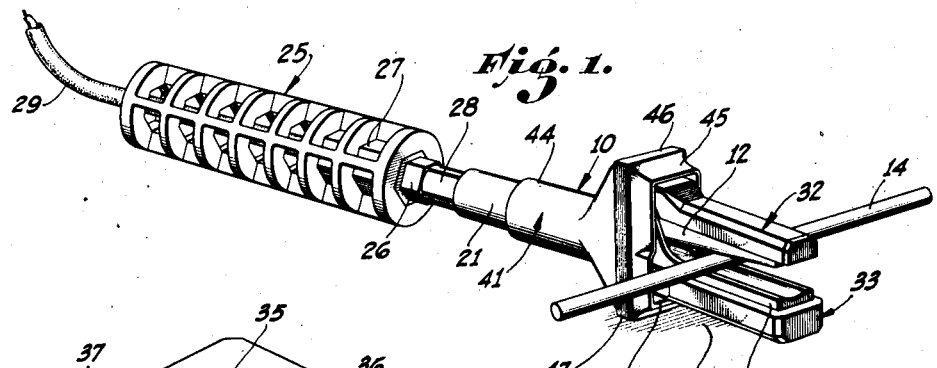
Fig. 1 is a perspective view of an electrode holder embodying my invention.

In Fig. 1 I show the electrode holder 10 as it would appear resting on a horizontal surface 11. Between the upper and lower jaws 12 and 13 an electrode 14 is shown substantially parallel to and supported out of contact with the horizontal surface 11.

Figure 4:
Fig. 4 is an enlarged view, partly in section, and showing the manner in which the insulating members substantially surround the metallic parts of the electrode holder.
Figure 4:
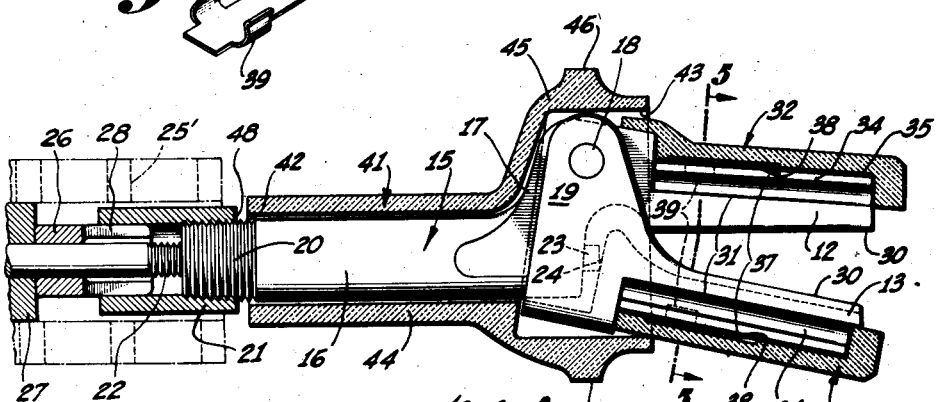

As shown in Fig. 4, the electrode holder has a metal body 15 consisting of a tubular portion 16 and a head portion 17, from which head portion 17 the upper jaw 12 projects forwardly. The head portion 17 of the body 15 supports a pivot pin or rivet 18 engaged by the inner portion 19 of the lower jaw 13, thereby supporting the jaw 13 so that it may swing from the lowered position in which it is shown in Fig. 4 toward the upper jaw 12. The rearward end of the tubular portion 16 is provided with threads 20 and upon these threads 20 a sleeve 21 is screwed, as shown in Fig. 4. This sleeve 21 is shown in perspective in Fig. 1.

A threaded shaft or screw 22 screws into the tubular portion 16 of the metal body 15, and, in accordance with the teachings of my Patent No. 1,706,907 for Electrode holder, granted March 26, 1929, actuates a pin 23, Fig. 4, forwardly so as to apply pressure against a shoulder 24 of the jaw 13, whereby the jaw 13 is rotated in anticlockwise direction on the pivot 18. A handle 25 is connected to the leftward portion of the screw 22 by metal means 26 having a portion 27 which projects within the rightward portion of the handle 25, and having rightwardly extending fingers 28 which project into the sleeve 21 and make sliding electric contact therewith, whereby electric current may be transmitted from the metal means 26 to the metal body 15 of the holder. An electric conductor 29 is extended within the handle 25 so as to connect with the leftward portion 27 of the means 26. It will be perceived that the handle 25 is mounted upon one end of the screw 22 and that the metal body 15 of the holder is mounted upon or supported by the other end of the screw 22, in such manner that the metal body 15 may have rotation relatively to the handle 25, and that this relative rotation will accomplish relative movement of the jaws 12 and 13, such relative movement in this instance consisting of movement of the lower jaw 13 toward and away from the upper jaw 12.

Figure 5:
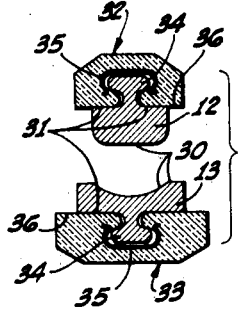
Fig. 5 is a sectional view taken as indicated by the line 5—5 of Fig. 4.

As will be perceived from Figs. 4 and 5, the jaws 12 and 13 have inner faces 30 to engage the welding rod 14 and outer faces 31 adjacent or upon which jaw insulators 32 and 33 are mounted by means of T ribs 34 which project outwardly from the outer faces 31 of the jaws so as to be received in companion undercut channels or slots 35 recessed into the inner faces 36 of the jaw insulators 32 and 33, which faces 36 rest against the outer faces 31 of the jaws 12 and 13.

Figure 2:
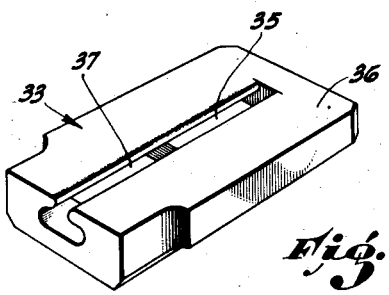
Fig. 2 is a perspective view of one of the jaw insulators, this view looking toward the inner face thereof.
Figure 3:
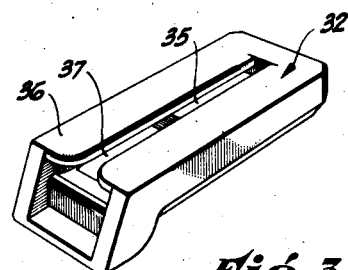
Fig. 3 is a perspective view of the other jaw insulating member, looking toward the inner face thereof.
Figure 6:
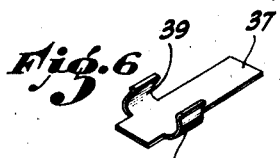
Fig. 6 is an enlarged perspective view of one of the latch elements used to secure a jaw insulating member upon a jaw of the electrode holder.

As shown in Figs. 2, 3, and 4, the under channels 35 are open at the leftward ends of the jaw insulators 32 and 33 so that these insulators may be slid leftward onto the ribs 34 and thereby secured to the outer faces 31 of the jaw members 12 and 13. The insulators 32 and 33 are held on the jaws 12 and 13 by automatically engaging latch means which function when the insulators 32 and 33 have been moved into their operative positions on the jaws 12 and 13, shown in Fig. 4. The securing means comprise spring catches 37 positioned so as to engage transverse shoulders 38 in the outer portions of the ribs 34, such shoulders 38 being preferably formed by notches in the outer portions of the ribs 34, as shown in Fig. 4. The spring catches 37 are stamped from metal in the form shown in Fig. 6. Near the leftward ends thereof they have upwardly bent tongues 39 spaced apart and having a curvature in accordance with the undercut portions of the channels 35 of the jaw insulators 32 and 33, these tongues 39 having the function of holding the spring catches in place in the molds in which the insulators 32 and 33 are formed, and also for anchoring the spring catches 37 within the insulators 32 and 33 as clearly shown in Fig. 5. Prior to and during the molding of the jaw insulators 32 and 33, the spring catches 37 lie flat as shown in Fig. 6, and after the completed jaw insulators 32 and 33 are removed from the molds, the rightward ends of the spring catches 37 are bent, as shown in Fig. 4, into positions for engagement with the shoulders 38 of the jaws 12 and 13. The simple manner in which the jaw insulators are placed and secured upon the jaws 12 and 13 without the use of screws, has been explained. Whenever replacement of one of these insulators 32 or 33 becomes necessary, the workman may readily slide a new one onto a jaw of the electrode holder, without use of screws or other threaded connecting means, and without need for the use of tools.

On the metal body 15 there is a hollow body 41 of insulating material. This hollow body substantially encloses the body 15. At its rear, or left end it has an opening 42 of small diameter through which threaded portion 20 projects, and through which the screw 22 may extend so as to make connection with the handle 25 and its associated parts. At the front or right end of the hollow body 41 there is a relatively larger opening 43 through which the jaws 12 and 13 project to the exterior. The hollow body 41 has a tubular portion 44 which surrounds the tubular portion 16 of the metal body 15, this tubular portion 44 joining an enlarged hollow prismoidal portion 45 having formed thereon a short circumscribing rib or short flange 46, at least one portion of which is formed so as to provide a rest 47, which, when it is in engagement with a surface 11 of Fig. 1, will hold the electrode holder in such position that the plane of meeting of the inner faces 30 of the jaws 12 and 13 when they are closed, will be substantially parallel to the surface 11, and so that a welding rod 14 held by these jaws will be maintained in raised and approximately parallel relation to the surface 11, thereby making it possible for the welder to lay the electrode holder upon the surface of a grounded metal part, without the welding rod 14 being brought into engagement with the metal part, and with the metal part of the holder insulated from engagement with the grounded metal part. In the embodiment shown, the rest 47 comprises the lower part of the circumscribing rib 46 flattened in a plane parallel to the plane of meeting of the jaws 12 and 13. The rib 46 is rectangular, as clearly shown in Fig. 1, and the opening 43 is also approximately rectangular, and is of such size that the inner or leftward ends of the jaw insulators 32 and 33 may project a short distance thereinto. As will be clearly perceived in Figs. 1 and 5, the transverse dimensions of the jaw insulators 32 and 33 are materially greater than the transverse dimensions of the jaws 12 and 13, so that the insulators 32 and 33 will project laterally beyond the side faces and the ends of the jaws 12 and 13, and thereby define a volume of space considerably larger than the volume of space occupied by the jaws 12 and 13.

The hollow insulator body 41 is slid into its cooperative position on the metal body 15, and is held thereon without the use of supplementary attachment means. The head portion 17 of the body 15 limits rightward movement of the hollow body 41, and the sleeve 21 provides a shoulder 48 which limits leftward movement of the hollow body 41. To place or replace the hollow body 41 upon the metal body 15 of the holder, the workman unscrews the screw 22 so as to disengage it from the tubular portion 16, and then unscrews the sleeve 21; whereupon a hollow insulator body 41 may be readily slid onto or off from the metal body 15.

The handle 25 is axially movable on the leftward portion 27 of the member 26 so that the handle, in accordance with the desires of the operator, may be moved into extended relation to the jaw portion of the holder or in retracted relation, or, in other words, so that the user may have by this simple adjustment either a short holder or a long holder. In Fig. 1 the insulated handle 25 is shown in extended relation—that is to say, it is moved leftward on the metal member 26. In Fig. 5 dotted lines 25' indicate the rightward end of the handle 25 when it is in contracted relation to the rest of the holder. At this time the rightward portion of the handle 25 will enclose the sleeve 21. It will be perceived that the electrode holder comprises two hollow members in axial relation, these hollow members being the handle 25 made of insulating material and the hollow insulator body 41. These hollow insulator members 25 and 41 are supported for relative rotation, that is to say, the handle 25 may be rotated with relation to the hollow body 41, and this relative rotation is transmitted to the mechanism lying within the hollow body 41 wherein it accomplishes movement of the jaw member 13.

An additional feature of the invention is that when the holder is rested upon a grounded metal surface, its metal parts will be held in such spaced relation to the grounded metal parts, that an electric arc cannot be sustained between the holder and the metal member upon which it is resting. The handle 25 is of such diameter and the rectangular rib 46 is of such size that the metal parts of the holder will be held in raised relation to the grounded plate upon which the holder may be rested.

I claim as my invention:

1. In an electrode holder of the class described, the combination of: a hollow body assembly of insulating material defining axially aligned spaces in which metal handle members may be operatively contained; and metal body and handle members in said hollow body assembly, there being jaw means projecting from said metal body member, said metal body and handle members comprising parts operatively associated so that rotation of one of said parts relatively to another of said parts will actuate said jaw members, said hollow body assembly in a like manner having portions formed so as to have relative rotation, said portions being connected to said parts whereby rotation of said portions will transmit a like rotation to said parts to actuate said jaw means.

2. In an electrode holder of the class described, the combination of: a handle member of insulating material having an opening in the rear end to receive a cable and having an opening in the front end; a hollow body adjacent the front end of said handle member, the rear end of said hollow body having an opening facing the opening in the front end of said handle member and an opening in the front end thereof through which jaw members may project, said handle member and said hollow body being relatively rotatable on the axis of said handle member; a holder body in said hollow body having jaws projecting therefrom through said opening in the front end thereof, said holder carrying actuating means for relative adjustment of said jaws, whereby an electrode may be gripped, and operating means extending from the opening in the rear end thereof operative by rotation to operate said actuating means, said operating means extending into the opening at the front end of said handle member and having engagement with said handle member whereby relative rotation of said handle member and said hollow body will produce relative rotative of said holder body and said operating means to actuate said jaws; and insulating means carried by said jaws.

3. In an electrode holder of the class described, the combination of: a body having jaws projecting from the forward portion thereof; means to move at least one of said jaws toward the other; an insulated handle connected to said body; tubular insulating means on said body to hold the same from contact with other objects, said tubular insulating means having a non-circular external portion to provide non-rolling engagement with a supporting surface; and insulating means for said jaws.

4. In an electrode holder of the class described, the combination of: a body having a relatively slender shank forming the rearward portion thereof and an enlargement at the front end thereof; jaws projecting from said enlargement; means to move at least one of said jaws toward the other; an insulated handle connected to said body; insulating means on said body to hold the same from contact with other objects, said insulating means comprising a tubular wall, small at its rear end and enlarging toward its front end and having thereat a large opening through which said jaws project from said enlargement of said body, whereby said insulating means may be moved onto said body from the rear end thereof; and insulating means for said jaws.

5. In an electrode holder of the class described, the combination of: a body having a relatively slender shank forming the rearward portion thereof and an enlargement at the front end thereof; jaws projecting from said enlargement; means to move at least one of said jaws toward the other; an insulated handle connected to said body; insulating means on said body to hold the same from contact with other objects, said insulating means comprising a tubular wall, small at its rear end and enlarging toward its front end and having thereat a large opening through which said jaws project from said enlargement of said body, whereby said insulating means may be moved onto said body from the rear end thereof and said insulating means having at its forward end a peripheral wall of approximate polygonal form; and insulating means for said jaws disposed with their inner ends projecting into said large opening of said tubular wall.

6. In an electrode holder of the class described, the combination of: a body having a relatively slender shank forming the rearward portion thereof and an enlargement at the front end thereof; jaws projecting from said enlargement;

means to move at least one of said jaws toward the other; an insulated handle connected to said body; insulating means on said body to hold the same from contact with other objects, said insulating means comprising a tubular wall, small at its rear end and enlarging toward its front end and having thereat a large opening through which said jaws project from said enlargement of said body, whereby said insulating means may be moved onto said body from the rear end thereof, the forward portion of said insulating means having a part of its peripheral face flattened so as to lie in a plane substantially parallel to the plane of meeting of said jaws; and insulating means for said jaws.

7. In an electrode holder of the class described, the combination of: a body having jaws projecting from the forward portion thereof, said jams having track means on the exterior thereof; means to move at least one of said jaws toward the other; an insulated handle connected to said body; insulating means on said body to hold the same from contact with other objects; insulating means for said jaws, said last named insulating means having track means for cooperating interlocking engagement with said track means of said jaws and being slidable onto said jaws and resilient means to lock the insulating means on said jaws.

8. In an electrode holder having a body, the combination of: a jaw extending from said body, said jaw having a rib along the back thereof, there being a notch in said rib; and a protector for said jaw comprising a body of insulating material having an undercut groove therein to fit said rib of said jaw and being slidable into a position on said jaw, and a catch resiliently carried by said protector to engage said notch and hold said protector on said jaw.

9. A protector for a jaw of an electrode holder, which jaw has an undercut rib extending therealong, comprising a body of insulating material having an undercut channel open at at least one end of said body, to receive said rib and a catch disposed in said channel of said body for automatic locking engagement with a portion of said rib when said body is slid into operative position thereon.

10. For use on a jaw of an electrode holder, which jaw has on its back portion a track for engagement with a part adapted to be slid into operative position relative to said jaw, a protector comprising a body of insulating material having a wall formed so as to have sliding interengagement with said track whereby said body may be slid onto said jaw.

11. For use with an electrode holder having a body with jaw means projecting therefrom, a protector for said body comprising a tubular wall of insulating material with an enlargement at its front end and a radial portion at its rear end, to surround a substantial portion of said body, said tubular wall having a large opening in the front end thereof and a small opening in the rear end thereof, and being adapted to be slid onto said body from the rear end thereof.

12. In an electrode holder of the class described, the combination of: a handle member of insulating material having an opening in the rear end to receive a cable and having an opening in the front end; a hollow body adjacent the front end of said handle member, the rear end of said hollow body having an opening facing the opening in the front end thereof through which jaw members may project, said handle member and said hollow body being relatively rotatable on the axis of said handle member; and a holder body in said hollow body having jaws projecting therefrom through said opening in the front end thereof, said holder carrying actuating means for relative adjustment of said jaws, whereby an electrode may be gripped, and operating means extending from the opening in the rear end thereof operative by rotation to operate said actuating means, said operating means extending into the opening at the front end of said handle member and having engagement with said handle member whereby relative rotation of said handle member and said hollow body will produce relative rotation of said holder body and said operating means to actuate said jaws.

13. An electrode holder as described in claim 12 wherein said hollow body has a non-circular portion for engagement with a supporting surface.

MARTIN WELLS.